United States Patent
Siuchta et al.

(10) Patent No.: US 10,632,842 B2
(45) Date of Patent: Apr. 28, 2020

(54) VEHICLE WITH TANDEM AXLE ASSEMBLY AND METHOD

(71) Applicant: International Truck Intellectual Property Company, LLC, Lisle, IL (US)

(72) Inventors: Grzegorz Siuchta, Des Plaines, IL (US); Dean Opperman, Plainfield, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 228 days.

(21) Appl. No.: 15/882,645

(22) Filed: Jan. 29, 2018

(65) Prior Publication Data

US 2019/0232783 A1    Aug. 1, 2019

(51) Int. Cl.
*B60K 23/08* (2006.01)
*B60K 17/36* (2006.01)
*B60K 23/04* (2006.01)
*B60K 17/35* (2006.01)

(52) U.S. Cl.
CPC .............. *B60K 17/36* (2013.01); *B60K 17/35* (2013.01); *B60K 23/04* (2013.01); *B60K 23/08* (2013.01)

(58) Field of Classification Search
CPC ........ B60K 17/35; B60K 17/36; B60K 23/04; B60K 23/08
See application file for complete search history.

(56) References Cited

U.S. PATENT DOCUMENTS

| | | | | |
|---|---|---|---|---|
| 2,352,301 | A | * | 6/1944 | Welles ................ B60K 17/352 180/24 |
| 2,711,222 | A | * | 6/1955 | Bock ..................... B60K 17/36 180/24 |
| 5,711,389 | A | * | 1/1998 | Schlosser ............... B60K 17/36 180/197 |
| 5,860,889 | A | * | 1/1999 | Schlosser ............... B60K 17/36 180/24.09 |
| 2001/0032768 | A1 | * | 10/2001 | Gassmann ............. B60K 23/08 192/48.92 |
| 2012/0018983 | A1 | | 1/2012 | Oriet |
| 2018/0319278 | A1 | * | 11/2018 | Davis ................... B60K 17/346 |

FOREIGN PATENT DOCUMENTS

| | | | | |
|---|---|---|---|---|
| WO | WO-2016022292 | A1 | * 2/2016 | ............ B60K 23/08 |
| WO | WO-2016205480 | A1 | * 12/2016 | ............ B60K 17/36 |

* cited by examiner

*Primary Examiner* — James A English
(74) *Attorney, Agent, or Firm* — Jeffrey P. Calfa; Mark C. Bach (57) ABSTRACT

A 6×2 tandem axle drive has an auxiliary 6×4 drive that is automatically engaged and disengaged. A forward rear drive axle has an input shaft with a clutch selectively driving a simple transfer shaft. A rearward rear drive axle is driven by an inter-axle transfer drive shaft that receives power from the simple transfer shaft. At least one wheel disconnect clutch is operable to selectively connect and disconnect at least one wheel of the rearward rear drive axle from the differential of the axle. A control module is configured to selectively place the vehicle in 6×2 mode by disengaging the clutch on the input shaft of the forward rear drive axle and disengaging the wheel disconnect clutch, and in a 6×4 mode by engaging the clutch on the input shaft of the forward rear drive axle and engaging the wheel disconnect clutch.

14 Claims, 3 Drawing Sheets

VEHICLE WITH TANDEM AXLE ASSEMBLY AND METHOD

BACKGROUND

Embodiments described herein generally relate to arrangements and methods for providing 6×4 drive functionality to a vehicle in a simple, lightweight, and efficient form, while avoiding excessive additional un-sprung and rotating mass and friction losses commonly associated with conventional 6×4 axle arrangements.

Related Art

A vehicle, such as a truck, a bus, and the like, is often provided with an engine, a transmission, and one or more drive axles. In order to provide support and traction, it is known to provide two or more rear drive axles, sometimes in conjunction with one or more non-driving axles, at the rear of the vehicle. In order to propel the vehicle, the engine produces rotational torque and power. The transmission receives rotational torque and power from the engine and is equipped with several gear ratios, in order to adapt the torque and power-producing characteristics of the engine to the propulsion and acceleration needs of the vehicle. The transmission then outputs the rotational torque and power to a propeller shaft, which delivers it to the one or more rear drive axles. A vehicle that is configured with a front non-driving axle, and two rear driving axles, may be referred to as having a 6×4 axle arrangement. A vehicle that is configured with a front non-driving axle, one rear driving axle, and one rear non-driving axle, may be referred to as having a 6×2 axle arrangement.

It is further known to provide a power divider or inter-axle differential to divide the rotational power between the foremost driving rear axle and any one or more subsequent driving rear axle, such as in vehicle having a 6×4 axle arrangement. The power divider or inter-axle differential may be attached to the front driving rear axle, and may deliver power to the front driving rear axle by way of a direct connection, such as gearing, and may deliver power to the rearward driving rear axle by way of an output connected to an inter-axle shaft. The power divider or inter-axle differential functions to deliver rotational power to the front driving rear axle and to the rearward driving rear axle while compensating for any differences in rotational speed of between the front driving rear axle and the rearward driving rear axle. Additionally, the power divider or inter-axle differential may selectively couple or lock together the rotational speeds of the front driving rear axle and of the rearward driving rear axle, for example under low traction conditions. Each of the frontward and rearward driving rear axles may additionally be provided with differential gears, in order to compensate for differences between the rotational speed of the wheels on one side of the vehicle and the rotational speed of the wheels on the other side of the vehicle, such as differences in rotational speed encountered when the vehicle turns. Each of these differential gears of the frontward and rearward driving rear axles may further be provided with locks or couplings that constrain the wheels on one side of the vehicle and the wheels on the other side of the vehicle to rotate at the same speed, for example under low traction conditions.

A limited number of vehicles are equipped with a 6×2 axle arrangement, for example having only one rear drive axle and one pusher or tag axle. These vehicles experience very low market penetration, typically less than five percent of dual rear axle trucks and highway tractors. This is due at least in part to deficiencies of the 6×2 configuration, which include reduced low-traction performance, increased tire wear, and lower resale value. Yet, under normal traction conditions, a vehicle configured with a 6×2 axle arrangement is more efficient than a vehicle having a 6×4 axle arrangement. This is due at least in part to the increased rotating mass and friction losses associated with the power divider or inter-axle differential used in a vehicle having a 6×4 axle arrangement. Furthermore, the power divider or inter-axle differential is a complex mechanical part, and as such is expensive to manufacture, adds to the cost of the vehicle, and is subject to mechanical breakdown and/or maintenance requirements.

Accordingly, there is an unmet need for an arrangement that provides 6×4 drive functionality to a vehicle in an inexpensive, simple, lightweight, and efficient form, while avoiding excessive additional un-sprung and rotating mass and friction losses commonly associated with conventional 6×4 axle arrangements.

SUMMARY

According to one embodiment of the 6×2 tandem axle drive having an auxiliary 6×4 drive with automatic engagement and disengagement, a vehicle has a chassis, an engine attached to the chassis, and a transmission connected to the engine. A forward rear drive axle is attached to the chassis and has an input shaft driven by the transmission. A simple transfer shaft is selectively driven by a clutch on the input shaft of the forward rear drive axle. A rearward rear drive axle is also attached to the chassis and is driven by an inter-axle transfer drive shaft. The inter-axle transfer drive shaft receives power from the simple transfer shaft. At least one wheel disconnect clutch is connected to at least one axle shaft of the rearward rear drive axle.

According to another embodiment of the 6×2 tandem axle drive having an auxiliary 6×4 drive with automatic engagement and disengagement, a tandem axle assembly of a vehicle having a prime mover has a forward rear drive axle with an input shaft driven by the prime mover. A simple transfer shaft is selectively driven by a clutch on the input shaft of the forward rear drive axle. A rearward rear drive axle is driven by an inter-axle transfer drive shaft, which receives power from the simple transfer shaft. At least one wheel disconnect clutch is connected to at least one axle shaft of the rearward rear drive axle.

According to another embodiment of the 6×2 tandem axle drive having an auxiliary 6×4 drive with automatic engagement and disengagement, a method of controlling tandem axle assembly of a vehicle having a prime mover includes several steps. The first step is driving an input shaft of a forward rear drive axle with the prime mover. The second step is selectively driving a simple transfer shaft using a clutch on the input shaft of the forward rear drive axle. The third step is connecting an inter-axle transfer drive shaft to the simple transfer shaft. The fourth step is driving a rearward rear drive axle with the inter-axle transfer drive shaft. The fifth step is selectively connecting at least one wheel of the rearward rear drive axle to a differential of the rearward rear drive axle using at least one wheel disconnect clutch connected to at least one axle shaft of the rearward rear drive axle.

DETAILED DESCRIPTION

Embodiments described herein relate to a 6×2 tandem axle drive having an auxiliary 6×4 drive with automatic engagement and disengagement, and a system and method for the use thereof. The 6×2 tandem axle drive having an auxiliary 6×4 drive may be applied to various types of vehicles, such as highway or semi-tractors, straight trucks, busses, fire trucks, agricultural vehicles, and etcetera. The several embodiments of the 6×2 tandem axle drive having an auxiliary 6×4 drive presented herein are employed on vehicles having a traditional ladder frame and rigid axles as examples, but this is not to be construed as limiting the scope of the 6×2 tandem axle drive having an auxiliary 6×4 drive with automatic engagement and disengagement, and system and method for the use thereof, which may be applied to vehicles and axle/suspension systems of differing construction.

More specifically, embodiments of the 6×2 tandem axle drive having an auxiliary 6×4 drive may use a rear tandem axle assembly having a forward rear drive axle and a rearward rear drive axle. A simple forward rear drive axle transfer shaft, i.e.—a transfer shaft not having any power divider or inter-axle differential, selectively receives power from the forward rear drive axle input shaft by way of a clutched input shaft transfer gear and a forward rear drive axle transfer shaft transfer gear. The forward rear drive axle transfer shaft then selectively delivers power, according to the setting of the transfer gear clutch, to the rearward rear drive axle input by way of an inter-axle transfer drive shaft. The rearward rear drive axle is further provided with at least one, and possibly two, wheel disconnect dog clutches within at least one rearward rear drive axle shaft that are operable to selectively connect and disconnect the rearward rear drive axle differential side gears of the rearward rear drive axle differential and the rearward rear wheels of the rearward rear drive axle. In this way, when the at least one wheel disconnect dog clutch is disengaged, the rearward rear drive axle differential spider gears freewheel, thereby providing a neutral mode to the rearward rear drive axle input shaft. This minimizes friction drag losses and rotating mass energy losses associated with the forward rear drive axle transfer shaft, forward rear drive axle transfer shaft transfer gear, input shaft transfer gear and clutch, and rearward rear drive axle differential.

The transfer gear clutch and the at least one wheel disconnect dog clutch are connected to and controlled by at least one control module, which may be a standalone control module, a vehicle control module, a powertrain control module, and/or an engine control module, as non-limiting examples. In operation, the at least one control module defaults to 6×2 mode, in order to take advantage of the mechanical efficiencies of this configuration. In the 6×2 mode, the transfer gear clutch is open and the at least one wheel disconnect dog clutch is open. Drive power flows from the vehicle driveshaft to the forward rear drive axle only, and the forward rear drive axle transfer shaft and rearward rear drive axle differential are stalled. In an embodiment wherein a single wheel disconnect dog clutch is used, the rearward rear drive axle differential side gears attached to the rearward rear drive axle shafts rotate freely in opposite directions, along with the rearward rear drive axle differential spider gears, which also rotate freely. In an embodiment wherein each rearward rear drive axle shaft has a wheel disconnect dog clutch, the rearward rear drive axle differential side gears and rearward rear drive axle differential spider gears are also stalled, further reducing friction and rotating mass losses. The at least one control module predominantly operates the vehicle in the 6×2 mode, for example whenever road conditions will allow 6×2 operation, which may be for example more than ninety percent of vehicle operation, in order to maximize fuel economy.

When, for example, additional traction is needed, the at least one control module places the rear tandem axle assembly in 6×4 mode by engaging the transfer gear clutch and the at least one wheel disconnect dog clutch. Power is then delivered to the forward rear drive axle and to the rearward rear drive axle by way of the input shaft transfer gear, the forward rear drive axle transfer shaft transfer gear, the forward rear drive axle transfer shaft, the inter-axle transfer drive shaft, and the rearward rear drive axle input. Power from the rearward rear drive axle input is then transmitted by the rearward rear drive axle input shaft to the rearward rear drive axle pinion gear, which transmits the power to the rearward rear drive axle ring gear that is connected to the rearward rear drive axle differential. Because the at least one wheel disconnect dog clutch is engaged, the rearward rear drive axle differential spider gears and the rearward rear drive axle differential side gears transmit the power to the rearward rear drive axle shafts and to the rearward rear wheels.

In order to determine when additional traction is needed, at least the forward rear drive axle, and possibly both the forward rear drive axle and the rearward rear drive axle, are provided with wheel speed sensors connected to the at least one control module. The wheel speed sensors may be dedicated wheel speed sensors, or may be otherwise provided for antilock braking or traction control purposes. When wheel slippage at the forward rear wheels is detected, the at least one control module infers the presence of low traction conditions and engages 6×4 mode. In order to prevent false indications of low traction conditions, for example due to a normal rotational speed differential between a driven and a non-driven axle, an average wheel speed of the forward rear drive axle may be compared to an average wheel speed of the rearward rear drive axle. Only when the average wheel speed difference is larger than a calibrated threshold value, and/or for longer than a calibrated period of time, does the at least one control module place the rear tandem axle assembly in 6×4 mode. In addition to reducing unwanted un-sprung and rotating mass and friction losses, eliminating the power divider or inter-axle differential provides full undivided power to both the forward rear drive axle and the rearward rear drive axle when in 6×4 mode under low traction conditions. More specifically, power is delivered in greater proportion to the axle presently having greater traction, which provides improved low traction condition performance.

However, when the vehicle enters high traction road conditions, such as dry concrete, the additional traction provided in 6×4 mode is no longer needed. Moreover, in the absence of a power divider or inter-axle differential, continued operation in 6×4 mode would cause uneven and excessive drivetrain load between the forward rear drive axle and the rearward rear drive axle. In order to prevent this, the at least one control module detects the buildup of torque load inequality between the forward rear drive axle and the rearward rear drive axle using load cells or torque sensors attached to the axle housing of each of the forward rear drive axle and the rearward rear drive axle. The torque load experienced by each of the forward rear drive axle and the rearward rear drive axle occurs in reaction to the torque being delivered by the axle shafts of each axle, such that a torque load inequality between the forward rear drive axle and the rearward rear drive axle is indicative of drivetrain loading between the axles. Drivetrain loading may occur, for example, during unequal sliding or scrub between the axles during cornering, or due to small variations in the loaded radius of the tires, possibly due to variations in tire or air suspension pressure. If drivetrain loading is present, one axle may produce more or less torque at the wheels than the other axle.

In order to distinguish between the presence of drivetrain loading under high traction conditions, and transients caused by variations in traction under low traction conditions, the at least one control module compares average readings from the load cells or torque sensors attached to the axle housing of each of the forward rear drive axle and the rearward rear drive axle. When the average torque load difference between the axles is greater than a calibrated threshold value, and/or present for a greater than a calibrated threshold period of time, the at least one control module places the rear tandem axle assembly in 6×2 mode by disengaging the transfer gear clutch and the at least one wheel disconnect dog clutch. As previously described, this disconnects power flow to the rearward rear axle, minimizing rotating mass and friction losses, and maximizing fuel economy.

Embodiments of the 6×2 tandem axle drive having an auxiliary 6×4 drive with automatic engagement and disengagement meet the need to have a heavy commercial vehicle that can operate in both 6×4 mode for low traction conditions, and in 6×2 mode for efficiency when in high traction conditions. Implementation of the 6×2 tandem axle drive having an auxiliary 6×4 drive with automatic engagement and disengagement may result in simplified vehicle operation, reduced un-sprung and rotating mass within the dual rear axle assembly, reduced overall vehicle weight, reduced mechanical friction, improved traction when in 6×4 mode due to the lack of an inter-axle differential, improved vehicle fuel efficiency when in 6×2 mode (for example two to four percent improvement), reduced greenhouse gas emissions, reduced cost of manufacturing, reduced maintenance, and lowered overall vehicle cost. Automatic engagement of the auxiliary 6×4 drive mode under low traction conditions based on the detection of wheel slippage, according to the method set forth previously, and automatic engagement of 6×2 drive mode based on the detection of a buildup of torque load inequality between the forward rear drive axle and the rearward rear drive axle, also according to the method set forth previously, provides additional traction only as necessary, and protects drivetrain and axle components from excessive load and minimizes time spent in 6×4 drive mode for improved fuel economy.

Existing 6×4 drive trucks may be converted to the 6×2 tandem axle drive having an auxiliary 6×4 drive with automatic engagement and disengagement configuration. In such a conversion, a 6×2 tandem axle drive having an auxiliary 6×4 drive will substitute for the existing standard 6×4 tandem. Additional air lines and wiring harness will be needed to provide a power source and controls to the transfer gear clutch actuator and to the at least one wheel disconnect clutch actuator. The at least one control module hardware and/or software may need additional Input and Output channels to accommodate inputs from wheel speed sensors and/or from axle housing load cells or torque sensors, and/or to accommodate outputs to control the transfer gear clutch actuator and/or the at least one wheel disconnect clutch actuator. The 6×4 mode and 6×2 mode transfer gear clutch and wheel disconnect dog clutch engagement and disengagement control strategy may utilize the existing vehicle Public Closed Area Network (CAN) massage parameters, such as transmission output shaft speed and wheel speeds, for non-limiting example. In such a conversion, therefore, a small number of new sensors and control parameters may be required. For non-limiting example, if the vehicle is presently provided with wheel speed sensors for anti-lock braking or for traction control, only the additional axle housing load cells or torque sensors, and the control parameters therefor, may be required in order to determine the drivetrain loading when transitioning to 6×2 mode under a high traction condition according to the method set forth previously.

Figure 1:
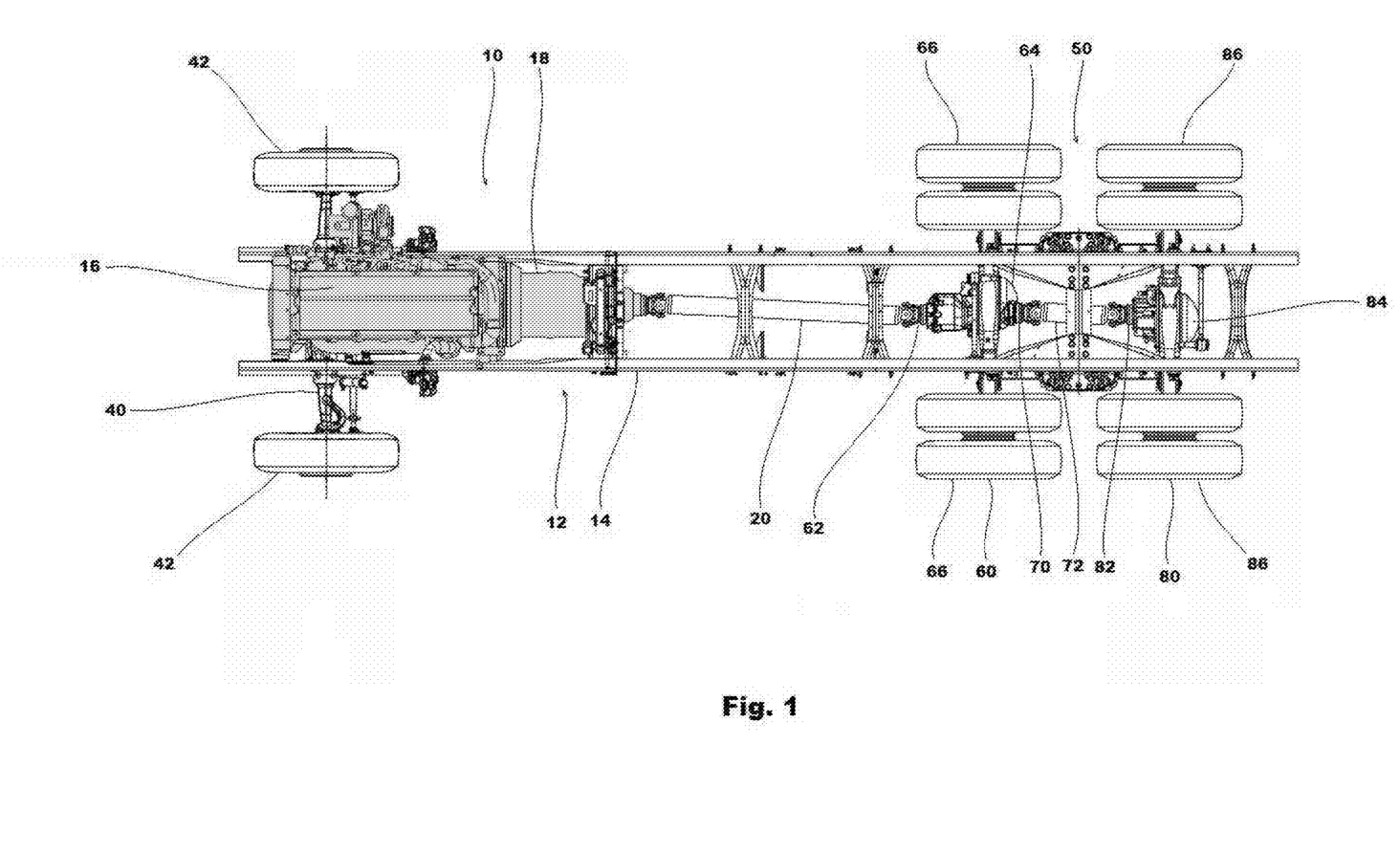
FIG. 1 is a top view of a vehicle having an embodiment of a 6×2 tandem axle drive having an auxiliary 6×4 drive with automatic engagement and disengagement, as described herein.

Referring now to FIG. 1, a top view of a vehicle 10 having an embodiment of a 6×2 tandem axle drive having an auxiliary 6×4 drive with automatic engagement and disengagement is shown. The vehicle 10 includes a chassis 12 having a frame 14, to which is attached a front driving or non-driving axle 40 having front wheels 42, and a rear tandem axle assembly 50. The rear tandem axle assembly 50 includes a forward rear drive axle 60 with forward rear wheels 66, and a rearward rear drive axle 80 having rearward rear wheels 86. An engine 16 provides power for propulsion by way of a transmission 18 and a driveshaft 20, which is connected to a forward rear drive axle input 62 of the forward rear drive axle 60. The forward rear drive axle 60 is provided with a forward rear drive axle differential 64, which serves to distribute power to the forward rear wheels 66, while allowing for differences in the rotation thereof, such as during cornering. The forward rear drive axle 60 is also provided with a forward rear drive axle output 70, to which is connected an inter-axle driveshaft 72. The inter-axle driveshaft 72 delivers power to a rearward rear drive axle input 82 of the rearward rear drive axle 80. The rearward rear drive axle 80 is provided with a rearward rear drive axle differential 84, which serves to distribute power to the rearward rear wheels 86, while allowing for differences in the rotation thereof, such as during cornering.

Figure 2:
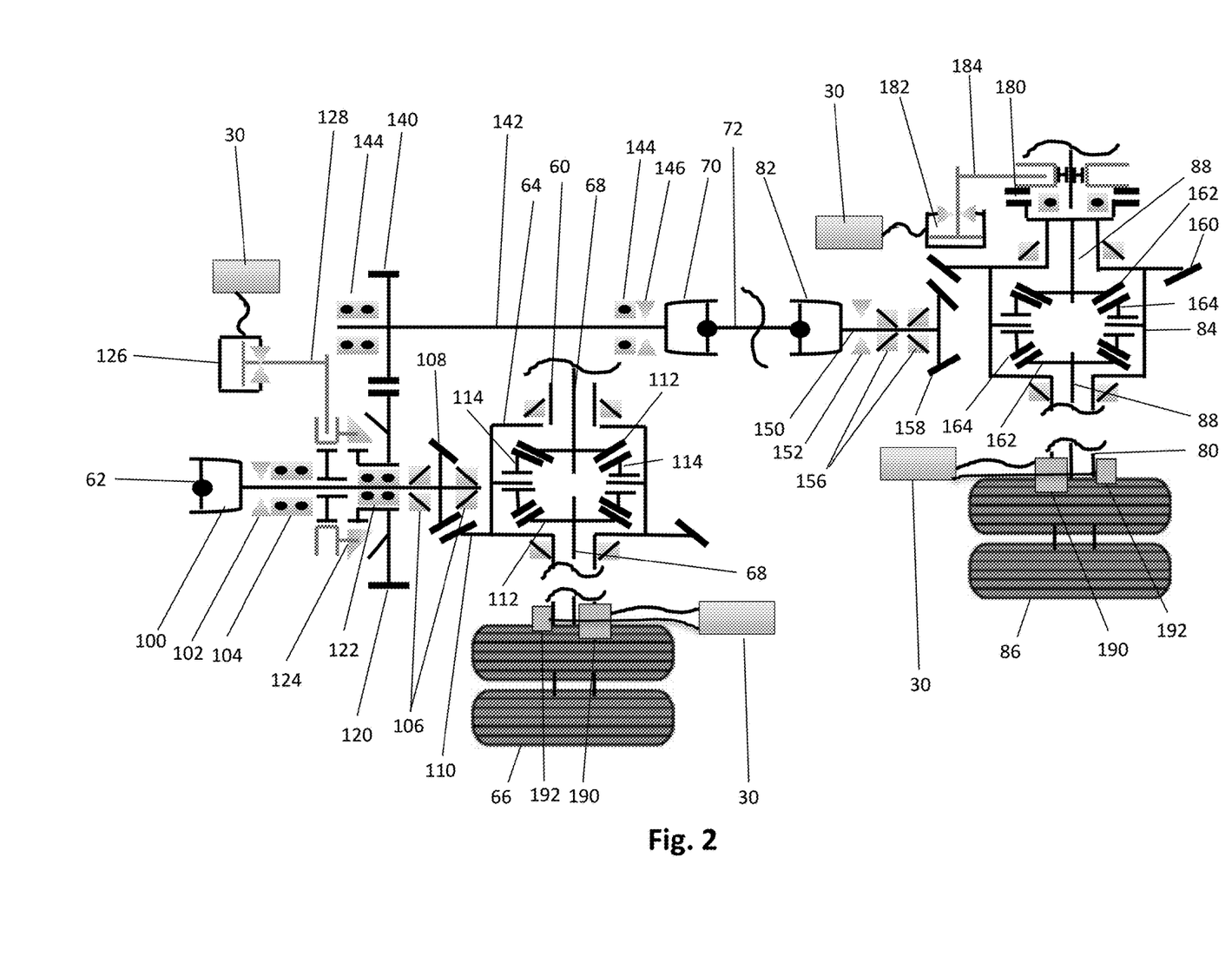
FIG. 2 is a graphical representation of an embodiment of a 6×2 tandem axle drive having an auxiliary 6×4 drive with automatic engagement and disengagement, as described herein.
Figure 3:
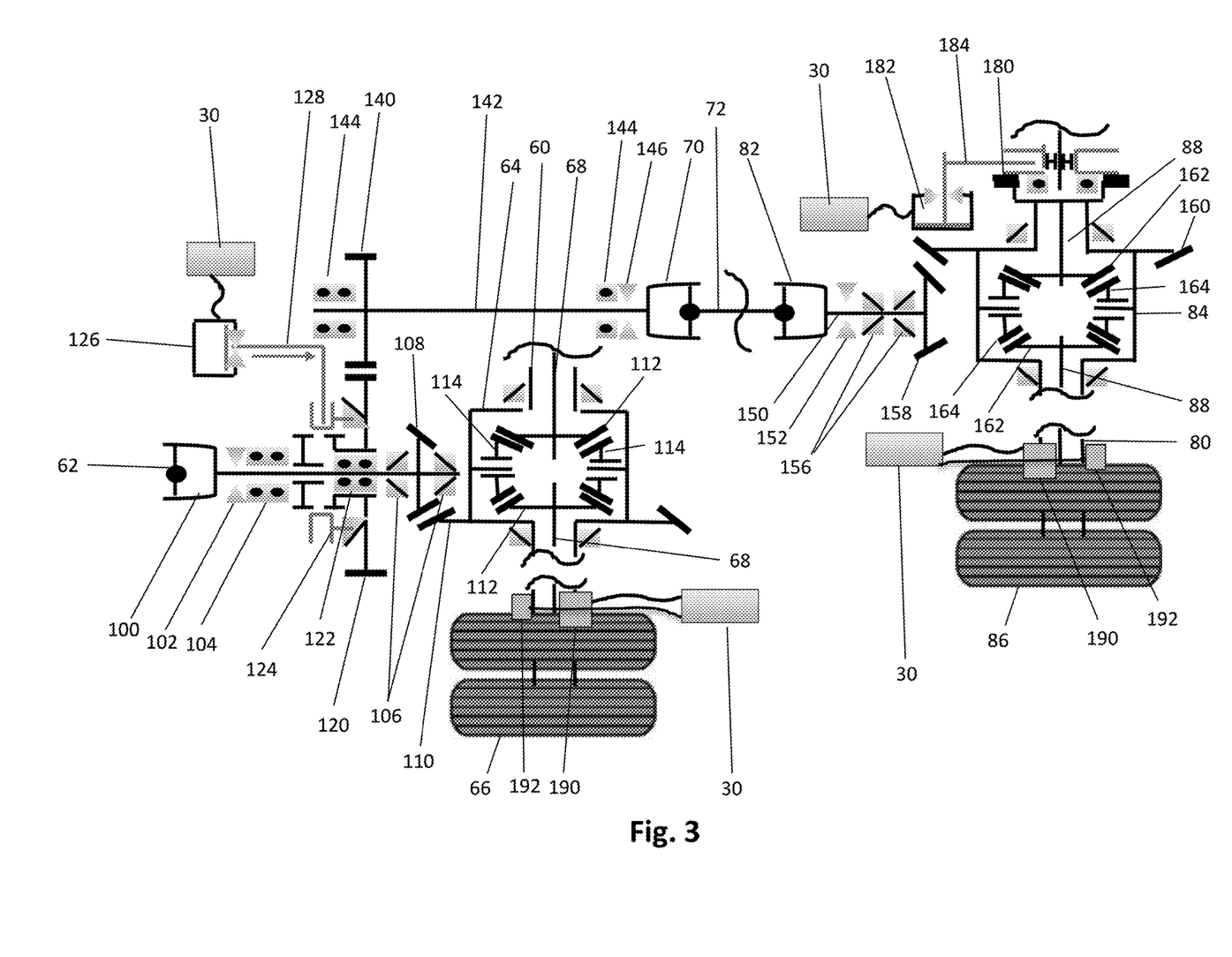
FIG. 3 is a graphical representation of an embodiment of a 6×2 tandem axle drive having an auxiliary 6×4 drive with automatic engagement and disengagement, as described herein.

Turning now to FIGS. 2 and 3, the 6×2 tandem axle drive having an auxiliary 6×4 drive with automatic engagement and disengagement is shown in further detail. A forward rear drive axle 60 receives power at a forward rear drive axle input 62, which is delivered by way of forward rear drive axle input shaft 100 to forward rear drive axle pinion gear 108. The forward rear drive axle input shaft 100 rides on input shaft ball bearings 104 and input shaft taper roller bearings 106, for non-limiting example. An input shaft oil seal 102 retains oil within the forward rear drive axle 60. The forward rear drive axle pinion gear 108 delivers power to forward rear drive axle ring gear 110, which is connected to forward rear drive axle differential 64. The forward rear drive axle differential 64 then delivers power to the forward rear drive axle shafts 68 of the forward rear drive axle 60 by way of forward rear drive axle differential spider gears 114 and forward rear drive axle differential side gears 112. The forward rear drive axle shafts 68 then deliver power to the forward rear wheels 66.

Meanwhile, an input shaft transfer gear 120 rides on the forward rear drive axle input shaft 100 by way of input shaft transfer gear ball bearings 122. A transfer gear clutch 124, which is selectively engaged or disengaged by a transfer gear actuator 126 operating through a transfer gear clutch actuator linkage 128, selectively delivers power from the forward rear drive axle input shaft 100 to the input shaft transfer gear 120. When the transfer gear clutch 124 is engaged, the input shaft transfer gear 120 delivers power to a forward rear drive axle transfer shaft transfer gear 140, which in turn drives a simple forward rear drive axle transfer shaft 142, i.e.—a transfer shaft not having any power divider or inter-axle differential. The forward rear drive axle transfer shaft 142 rides on forward rear drive axle transfer shaft ball bearings 144. A forward rear drive axle transfer shaft oil seal 146 further retains oil within the forward rear drive axle 60. The forward rear drive axle transfer shaft 142 then delivers power to a forward rear drive axle output 70.

Power from the forward rear drive axle output 70 is delivered by an inter-axle driveshaft 72 to a rearward rear drive axle input 82 of rearward rear drive axle 80. Rearward rear drive axle input 82 is connected to a rearward rear drive axle input shaft 150, which transmits the power from the rearward rear drive axle input 82 to rearward rear drive axle pinion gear 158. Rearward rear drive axle input shaft 150 rides on input shaft taper roller bearings 156, for non-limiting example. An input shaft oil seal 152 retains oil within the rearward rear drive axle 80. The rearward rear drive axle pinion gear 158 delivers power to rearward rear drive axle ring gear 160, which is connected to rearward rear drive axle differential 84. The rearward rear drive axle differential 84 then delivers power to the rearward rear drive axle shafts 88 of the rearward rear drive axle 80 by way of rearward rear drive axle differential spider gears 164 and rearward rear drive axle differential side gears 162. The rearward rear drive axle shafts 88 then deliver power to the rearward rear wheels 86.

As illustrated in FIGS. 1 and 2, the forward rear drive axle transfer shaft 142 rotates contrary to the forward rear drive axle input shaft 100 due to power being delivered to the forward rear drive axle transfer shaft 142 by way of input shaft transfer gear 120 and forward rear drive axle transfer shaft transfer gear 140. Because of this, the rearward rear drive axle differential 84 is reversed in orientation as compared to the forward rear drive axle differential 64, such that the rearward rear drive axle ring gear 160 is on the opposite side of the rearward rear drive axle differential 84. In alternate embodiments of the 6×2 tandem axle drive having an auxiliary 6×4 drive with automatic engagement and disengagement, an idler gear may be used between the input shaft transfer gear 120 and forward rear drive axle transfer shaft transfer gear 140, or a chain drive used, so that the rearward rear drive axle differential 84 retains the same orientation as the forward rear drive axle differential 64.

The rearward rear drive axle 80 is further provided with at least one wheel disconnect dog clutch 180, which is connected to at least one rearward rear drive axle shaft 88, and which is selectively engaged or disengaged by a wheel disconnect clutch actuator 182 acting through a wheel disconnect clutch actuator linkage 184. When the at least one wheel disconnect dog clutch 180 is engaged, the at least one rearward rear drive axle shaft 88 delivers power from the rearward rear drive axle differential side gear 162 of the rearward rear drive axle differential 84 to the rearward rear wheels 86 on that side of the rearward rear drive axle 80. When the at least one wheel disconnect dog clutch 180 is disengaged, the rearward rear drive axle differential side gear 162 of the rearward rear drive axle differential 84 is disconnected from the rearward rear wheels 86 on that side of the rearward rear drive axle 80. The at least one wheel disconnect dog clutch 180 may be embodied as two wheel disconnect dog clutches 180, one in each rearward rear drive axle shaft 88 of the rearward rear drive axle 80, each selectively engaged or disengaged by a wheel disconnect clutch actuator 182 acting through a wheel disconnect clutch actuat 6×4 mode is appropriate, at least the forward rear drive axle 60, and possibly both the forward rear drive axle 60 and the rearward rear drive axle 80, are provided with wheel speed sensors 192 connected to at least one control module 30. At least one control module 30 is illustrated in FIGS. 2 and 3 as multiple control modules 30 for simplicity of illustration, it being understood that the control modules 30 may represent a single control module or multiple control modules. When the at least one control module 30 detects wheel slippage at the forward rear wheels 66, according to the method set forth previously, the at least one control module 30 causes the transfer gear clutch actuator 126 to engage the transfer gear clutch 124 as shown in FIG. 3, thereby delivering power to the rearward rear axle 80 by way of the input shaft transfer gear 120, the forward rear drive axle transfer shaft 142, and the inter-axle driveshaft 72. At the same time, the at least one control module 30 causes the at least one wheel disconnect clutch actuator 182 to engage the at least one wheel disconnect dog clutch 180, as shown in FIG. 3. Power from the rearward rear drive axle input 82 is then transmitted by the rearward rear drive axle input shaft 150 to the rearward rear drive axle pinion gear 158, which transmits the power to the rearward rear drive axle ring gear 160 that is connected to the rearward rear drive axle differential 84. Because the at least one wheel disconnect dog clutch 180 is engaged, the rearward rear drive axle differential spider gears 164 and the rearward rear drive axle differential side gears 162 transmit the power to the rearward rear drive axle shafts 88 and to the rearward rear wheels 86.

In order to determine when the vehicle has entered high traction conditions, causing uneven and excessive drivetrain load between the forward rear drive axle 60 and the rearward rear drive axle 80, both the forward rear drive axle 60 and the rearward rear drive axle 80 are provided with axle housing load cells or torque sensors 190. When the at least one control module 30 detects the buildup of torque load inequality between the forward rear drive axle 60 and the rearward rear drive axle 80 using the axle housing load cells or torque sensors 190, according to the method set forth previously, the at least one control module 30 places the vehicle in 6×2 mode by causing the transfer gear clutch actuator 126 to disengage the transfer gear clutch 124 as shown in FIG. 2, thereby disconnecting power flow from the rearward rear axle 80. At the same time, the at least one control module 30 causes the at least one wheel disconnect clutch actuator 182 to disengage the at least one wheel disconnect dog clutch 180 as shown in FIG. 2. In an embodiment wherein a single wheel disconnect dog clutch 180 is used, the rearward rear drive axle differential side gears 162 attached to the rearward rear drive axle shafts 88 rotate freely in opposite directions, along with the rearward rear drive axle differential spider gears 164, which also rotate freely. In this way, the forward rear drive axle transfer shaft 142, the inter-axle transfer driveshaft 72, and the rearward rear drive axle differential 84 remain relatively stationary. In an embodiment wherein each rearward rear drive axle shaft 88 has a wheel disconnect dog clutch 180, the rearward rear drive axle differential side gears 162 and rearward rear drive axle differential spider gears 164 are also stalled, further reducing friction and rotating mass losses.

While the 6×2 tandem axle drive having an auxiliary 6×4 drive with automatic engagement and disengagement, and the system and method for the use thereof, has been described with respect to at least one embodiment, the 6×2 tandem axle drive having an auxiliary 6×4 drive can be further modified within the spirit and scope of this disclosure, as demonstrated previously. This application is therefore intended to cover any variations, uses, or adaptations of the 6×2 tandem axle drive having an auxiliary 6×4 drive using its general principles. Further, this application is intended to cover such departures from the present disclosure as come within known or customary practice in the art to which the disclosure pertains and which fall within the limits of the appended claims.

| REFERENCE NUMBER LISTING | |
|---|---|
| 10 | Vehicle |
| 12 | Chassis |
| 14 | Frame |
| 16 | Engine |
| 18 | Transmission |
| 20 | Driveshaft |
| 30 | Control module |
| 40 | Front drive/non-drive axle |
| 42 | Front wheels |
| 50 | Rear tandem axle assembly |
| 60 | Forward rear drive axle |
| 62 | Forward rear drive axle input |
| 64 | Forward rear drive axle differential |
| 66 | Forward rear wheels |
| 68 | Forward rear drive axle shafts |
| 70 | Forward rear drive axle output |
| 72 | Inter-axle transfer driveshaft |
| 80 | Rearward rear drive axle |
| 82 | Rearward rear drive axle input |
| 84 | Rearward rear drive axle differential |
| 86 | Rearward rear wheels |
| 88 | Rearward rear drive axle shafts |
| 100 | Forward rear drive axle input shaft |
| 102 | Input shaft oil seal |
| 104 | Input shaft ball bearings |
| 106 | Input shaft taper roller bearings |
| 108 | Forward rear drive axle pinion gear |
| 110 | Forward rear drive axle ring gear |
| 112 | Forward rear drive axle differential side gears |
| 114 | Forward rear drive axle differential spider gears |
| 120 | Input shaft transfer gear |
| 122 | Input shaft transfer gear ball bearings |
| 124 | Transfer gear clutch |
| 126 | Transfer gear clutch actuator |
| 128 | Transfer gear clutch actuator linkage |
| 140 | Forward rear drive axle transfer shaft transfer gear |
| 142 | Forward rear drive axle transfer shaft |
| 144 | Forward rear drive axle transfer shaft ball bearings |
| 146 | Forward rear drive axle transfer shaft oil seal |
| 150 | Rearward rear drive axle input shaft |
| 152 | Input shaft oil seal |
| 156 | Input shaft taper roller bearings |
| 158 | Rearward rear drive axle pinion gear |
| 160 | Rearward rear drive axle ring gear |
| 162 | Rearward rear drive axle differential side gears |
| 164 | Rearward rear drive axle differential spider gears |
| 180 | Wheel disconnect dog clutch |
| 182 | Wheel disconnect clutch actuator |
| 184 | Wheel disconnect clutch actuator linkage |
| 190 | Axle housing load cells or torque sensors |
| 192 | Wheel speed sensors |

What is claimed is:

1. A vehicle, comprising:
a chassis;
an engine attached to the chassis;
a transmission connected to the engine;
a forward rear drive axle attached to the chassis and having an input shaft driven by the transmission;
a simple transfer shaft selectively driven by a clutch on the input shaft;
a rearward rear drive axle attached to the chassis and driven by an inter-axle transfer drive shaft, the inter-axle transfer drive shaft receiving power from the simple transfer shaft;
at least one wheel disconnect clutch connected to at least one axle shaft of the rearward rear drive axle, wherein the clutch on the input shaft and the at least one wheel disconnect clutch being connected to and controlled by at least one control module, the at least one control module being one of a vehicle control module, an engine control module, a powertrain control module, and a standalone control module, and the at least one control module being configured to selectively place the vehicle in a 6×2 mode by disengaging the clutch on the input shaft and disengaging the at least one wheel disconnect clutch, and in a 6×4 mode by engaging the clutch on the input shaft and engaging the at least one wheel disconnect clutch; and
at least one forward rear wheel speed sensor attached to the forward rear drive axle and connected to the at least one control module, the at least one control module being configured to detect wheel slippage of at least one forward rear wheel using the at least one forward rear wheel speed sensor, and to place the vehicle in the 6×4 mode upon wheel slippage of the at least one forward rear wheel.

2. The vehicle of claim 1, wherein:
the at least one wheel disconnect clutch is operable to selectively connect and disconnect at least one wheel of the rearward rear drive axle from a differential of the rearward rear drive axle.

3. The vehicle of claim 2, wherein:
the at least one wheel disconnect clutch further comprises a right wheel disconnect clutch connected to a right axle shaft of the rearward rear drive axle, and a left wheel disconnect clutch connected to a left axle shaft of the rearward rear drive axle.

4. The vehicle of claim 1, further comprising:
at least one rearward rear wheel speed sensor attached to the rearward rear drive axle and connected to the at least one control module, the at least one control module being further configured to detect wheel slippage of at least one rearward rear wheel using the at least one rearward rear wheel speed sensor, and to place the vehicle in the 6×4 mode upon detecting an average wheel speed difference larger than a calibrated threshold value between the at least one forward rear wheel and the at least one rearward rear wheel.

5. The vehicle of claim 1, further comprising:
at least one first load cell or torque sensor attached to the forward rear axle and connected to the at least one control module;
at least one second load cell or torque sensor attached to the rearward rear axle and connected to the at least one control module; and
the at least one control module being configured to detect a torque load inequality between the forward rear axle and the rearward rear axle using the at least one first load cell or torque sensor and the at least one second load cell or torque sensor, and to place the vehicle in the 6×2 mode upon detection of the torque load inequality.

6. The vehicle of claim 5, wherein:
the at least one control module being further configured to compare average readings from the at least one first load cell or torque sensor attached to the forward rear axle and the at least one second load cell or torque sensor attached to the rearward rear axle, and to place the vehicle in the 6×2 mode upon an average torque load difference between the forward rear axle and the rearward rear axle being at least one of greater than a calibrated threshold value and present for a greater than a calibrated threshold period of time.

7. A tandem axle assembly of a vehicle having a prime mover, comprising:
a forward rear drive axle having an input shaft driven by the prime mover;
a simple transfer shaft selectively driven by a clutch on the input shaft;
a rearward rear drive axle driven by an inter-axle transfer drive shaft, the inter-axle transfer drive shaft receiving power from the simple transfer shaft;
at least one wheel disconnect clutch connected to at least one axle shaft of the rearward rear drive axle, wherein the clutch on the input shaft and the at least one wheel disconnect clutch being connected to and controlled by at least one control module, the at least one control module being one of a vehicle control module, an engine control module, a powertrain control module, and a standalone control module, and the at least one control module being configured to selectively place the vehicle in a 6×2 mode by disengaging the clutch on the input shaft and disengaging the at least one wheel disconnect clutch, and in a 6×4 mode by engaging the clutch on the input shaft and engaging the at least one wheel disconnect clutch; and
at least one forward rear wheel speed sensor attached to the forward rear drive axle and connected to the at least one control module, the at least one control module being configured to detect wheel slippage of at least one forward rear wheel using the at least one forward rear wheel speed sensor, and to place the vehicle in the 6×4 mode upon wheel slippage of the at least one forward rear wheel.

8. The tandem axle assembly of claim 7, wherein:
the at least one wheel disconnect clutch is operable to selectively connect and disconnect at least one wheel of the rearward rear drive axle from a differential of the rearward rear drive axle.

9. The tandem axle assembly of claim 8, wherein:
the at least one wheel disconnect clutch further comprises a right wheel disconnect clutch connected to a right axle shaft of the rearward rear drive axle, and a left wheel disconnect clutch connected to a left axle shaft of the rearward rear drive axle.

10. The tandem axle assembly of claim 7, further comprising:
at least one rearward rear wheel speed sensor attached to the rearward rear drive axle and connected to the at least one control module, the at least one control module being further configured to detect wheel slippage of at least one rearward rear wheel using the at least one rearward rear wheel speed sensor, and to place the vehicle in the 6×4 mode upon detecting an average wheel speed difference larger than a calibrated threshold value between the at least one forward rear wheel and the at least one rearward rear wheel.

11. The tandem axle assembly of claim 7, further comprising:
at least one first load cell or torque sensor attached to the forward rear axle and connected to the at least one control module;
at least one second load cell or torque sensor attached to the rearward rear axle and connected to the at least one control module; and the at least one control module being configured to detect a torque load inequality between the forward rear axle and the rearward rear axle using the at least one first load cell or torque sensor and the at least one second load cell or torque sensor, and to place the vehicle in the 6×2 mode upon detection of the torque load inequality.

12. The tandem axle assembly of claim 11, wherein:
the at least one control module being further configured to compare average readings from the at least one first load cell or torque sensor attached to the forward rear axle and the at least one second load cell or torque sensor attached to the rearward rear axle, and to place the vehicle in the 6×2 mode upon an average torque load difference between the forward rear axle and the rearward rear axle being at least one of greater than a calibrated threshold value and present for a greater than a calibrated threshold period of time.

13. A method of controlling tandem axle assembly of a vehicle having a prime mover, comprising the steps of:
driving an input shaft of a forward rear drive axle with the prime mover;
selectively driving a simple transfer shaft using a clutch on the input shaft;
connecting an inter-axle transfer drive shaft to the simple transfer shaft;
driving a rearward rear drive axle with the inter-axle transfer drive shaft;
selectively connecting at least one wheel of the rearward rear drive axle to a differential of the rearward rear drive axle using at least one wheel disconnect clutch connected to at least one axle shaft of the rearward rear drive axle;
connecting the clutch on the input shaft and the at least one wheel disconnect clutch to at least one control module;
configuring the at least one control module to selectively place the vehicle in a 6×2 mode by disengaging the clutch on the input shaft and disengaging the at least one wheel disconnect clutch, and in a 6×4 mode by engaging the clutch on the input shaft and engaging the at least one wheel disconnect clutch;
attaching at least one forward rear wheel speed sensor to the forward rear drive axle;
connecting the at least one forward rear wheel speed sensor to the at least one control module;
attaching at least one rearward rear wheel speed sensor to the rearward rear drive axle;
connecting the at least one rearward rear wheel speed sensor the at least one control module;
configuring the at least one control module to detect wheel slippage of at least one forward rear wheel using the at least one forward rear wheel speed sensor;
configuring the at least one control module to detect wheel slippage of at least one rearward rear wheel using the at least one rearward rear wheel speed sensor; and
configuring the at least one control module to place the vehicle in the 6×4 mode upon detecting an average wheel speed difference larger than a calibrated threshold value between the at least one forward rear wheel and the at least one rearward rear wheel.

14. The method of claim 13, further comprising the steps of:
attaching at least one first load cell or torque sensor to the forward rear axle;
connecting the at least one first load cell or torque sensor to the at least one control module;

attaching at least one second load cell or torque sensor to the rearward rear axle;

connecting the at least one second load cell or torque sensor to the at least one control module;

configuring the at least one control module to compare average readings from the at least one first load cell or torque sensor attached to the forward rear axle and the at least one second load cell or torque sensor attached to the rearward rear axle, and to place the vehicle in the 6×2 mode upon an average torque load difference between the forward rear axle and the rearward rear axle being at least one of greater than a calibrated threshold value and present for a greater than a calibrated threshold period of time.

* * * * *

UNITED STATES PATENT AND TRADEMARK OFFICE
CERTIFICATE OF CORRECTION

| | |
|---|---|
| PATENT NO. | : 10,632,842 B2 |
| APPLICATION NO. | : 15/882645 |
| DATED | : April 28, 2020 |
| INVENTOR(S) | : Siuchta et al. |

It is certified that error appears in the above-identified patent and that said Letters Patent is hereby corrected as shown below:

In the Specification

On Column 1, Line 3, before the "BACKGROUND", please insert the following paragraph:
-- STATEMENT REGARDING FEDERALLY SPONSORED RESEARCH OR DEVELOPMENT
This invention was made with government support under DE-EE0007767 awarded by the U.S. Department of Energy. The Government therefore has certain rights in the invention. --

Signed and Sealed this
Seventh Day of February, 2023

Katherine Kelly Vidal
*Director of the United States Patent and Trademark Office*